United States Patent
Mueller et al.

(10) Patent No.: US 12,237,915 B2
(45) Date of Patent: Feb. 25, 2025

(54) METHOD FOR OPERATING A PRIMARY COMMUNICATION DEVICE, INVOLVING MODIFICATION OF THE TRANSMISSION CONFIGURATION

(71) Applicant: Robert Bosch GmbH, Stuttgart (DE)

(72) Inventors: Andreas Mueller, Waiblingen (DE); Johannes Von Hoyningen-Huene, Kiel (DE)

(73) Assignee: Robert Bosch GmbH, Stuttgart (DE)

( * ) Notice: Subject to any disclaimer, the term of this patent is extended or adjusted under 35 U.S.C. 154(b) by 133 days.

(21) Appl. No.: 17/424,570

(22) PCT Filed: Dec. 30, 2019

(86) PCT No.: PCT/EP2019/087143
§ 371 (c)(1),
(2) Date: Jul. 21, 2021

(87) PCT Pub. No.: WO2020/151899
PCT Pub. Date: Jul. 30, 2020

(65) Prior Publication Data
US 2022/0077955 A1 Mar. 10, 2022

(30) Foreign Application Priority Data
Jan. 21, 2019 (DE) .................. 10 2019 200 690.6

(51) Int. Cl.
*H04L 1/00* (2006.01)
*H04L 1/02* (2006.01)
(Continued)

(52) U.S. Cl.
CPC .............. *H04L 1/0009* (2013.01); *H04L 1/02* (2013.01); *H04W 52/48* (2013.01); *H04L 1/1671* (2013.01); *H04L 1/1819* (2013.01)

(58) Field of Classification Search
CPC ....... H04L 1/0009; H04L 1/02; H04L 1/1671; H04L 1/1819; H04W 52/48
(Continued)

(56) References Cited

U.S. PATENT DOCUMENTS

2001/0023189 A1   9/2001   Kajimura
2003/0032440 A1*  2/2003   Sato ................... H04W 88/181
                                                            455/517
(Continued)

FOREIGN PATENT DOCUMENTS

CN       1423503 A    6/2003
CN       1656729 A    8/2005
(Continued)

OTHER PUBLICATIONS

Translation of International Search Report for Application No. PCT/EP2019/087143 dated Jun. 23, 2020 (4 pages).

*Primary Examiner* — Xuan Lu
(74) *Attorney, Agent, or Firm* — Michael Best & Friedrich LLP (57) ABSTRACT

A method for operating a primary communication device designed to transmit data packets via a transmission medium to at least one secondary communication device, said method comprising the following steps: at least temporarily modifying a transmission configuration for transmitting data packets; and transmitting at least a first data packet to the at least one secondary communication device using the transmission configuration.

10 Claims, 4 Drawing Sheets

(51) Int. Cl.
*H04L 1/1607* (2023.01)
*H04L 1/1812* (2023.01)
*H04W 52/48* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2003/0156572 | A1* | 8/2003 | Hui | H04L 1/1867 370/349 |
| 2005/0186963 | A1* | 8/2005 | VanLaningham | H04L 27/0008 455/452.1 |
| 2008/0225791 | A1* | 9/2008 | Pi | H04B 7/0632 370/329 |
| 2012/0300728 | A1* | 11/2012 | Lee | H04L 5/0026 370/329 |
| 2013/0107791 | A1* | 5/2013 | Oh | H04B 7/0452 370/312 |
| 2014/0133317 | A1 | 5/2014 | Chen et al. | |
| 2017/0332270 | A1* | 11/2017 | Gandhi | H04L 47/38 |
| 2018/0160400 | A1 | 6/2018 | Liu et al. | |
| 2020/0112478 | A1* | 4/2020 | Manolakos | H04L 5/0037 |
| 2020/0120458 | A1* | 4/2020 | Aldana | H04W 72/51 |
| 2022/0046564 | A1* | 2/2022 | Shimoda | H04W 56/0065 |

FOREIGN PATENT DOCUMENTS

| | | |
|---|---|---|
| CN | 104429009 A | 3/2015 |
| JP | 2001136150 A | 5/2001 |
| JP | 2001332987 A | 11/2001 |
| JP | 2002026790 A | 1/2002 |
| JP | 2003101520 A | 4/2003 |
| JP | 2003218840 A | 7/2003 |
| JP | 2010098766 A | 4/2010 |
| JP | 2011109700 A | 6/2011 |
| JP | 2012195836 A | 10/2012 |
| JP | 2018110344 A | 7/2018 |
| WO | 2009034606 A1 | 3/2009 |
| WO | 2009098614 A2 | 8/2009 |
| WO | 2017038193 A1 | 3/2017 |

* cited by examiner

METHOD FOR OPERATING A PRIMARY COMMUNICATION DEVICE, INVOLVING MODIFICATION OF THE TRANSMISSION CONFIGURATION

BACKGROUND OF THE INVENTION

The present disclosure relates to a method for operating a primary communication device, which is configured to transmit data packets to at least one secondary communication device via a transmission medium.

The present disclosure furthermore relates to a primary communication device for carrying out the aforementioned method.

The present disclosure furthermore relates to a method for operating a secondary communication device, which is configured to receive data packets from at least one primary communication device via a transmission medium, and a secondary communication device for carrying out said method.

SUMMARY OF THE INVENTION

Preferred embodiments relate to a method for operating a primary communication device, which is configured to transmit data packets to at least one secondary communication device via a transmission medium, wherein the method comprises the following steps: at least temporarily modifying a transmission configuration for transmitting data packets, transmitting at least one first data packet to the at least one secondary communication device using the transmission configuration.

In further preferred embodiments, it is provided that the transmission configuration, or the choice or the modification of a particular transmission configuration, makes it possible to influence a robustness of the transmission of data packets by means of the primary communication device, and/or to influence a packet error rate.

By modifying the transmission configuration, in further preferred embodiments, the transmission of the first data packet (and possibly also the transmission of other data packets to be transmitted) may be advantageously adjusted to existing operating conditions, in particular, transmission conditions in the area of the transmission medium, for example, disturbance(s), whereby, in further preferred embodiments, for example, a reception quality of the respective data packets at the secondary communication device may be improved such that the packet error rate or packet loss rate is reduced. In particular, in further preferred embodiments, for example, an increase in the robustness of the transmission of data packets to the secondary communication device may thereby also be effected dynamically, i.e., during the run time of the primary communication device.

In further preferred embodiments, the transmission configuration is modified temporarily, for example, for a first time range, such that an increase in the robustness of the transmission of data packets to the secondary communication device is effected. In further preferred embodiments, the transmission configuration is again modified following the first time range, in particular, in such a way that no (or a smaller) increase in the robustness of the transmission of data packets to the secondary communication device is achieved, relative to the transmission configuration existing before the first time range.

In other preferred embodiments, it is provided that the method furthermore comprises: receiving first information which characterizes possible errors in a reception of the first data packet by the secondary communication device. Thus, for example, it may be determined whether or not an at least temporary modification of the transmission configuration is warranted.

In further preferred embodiments, it is provided that the method furthermore comprises: receiving first information which characterizes the possible errors in a reception of at least one data packet transmitted from the primary communication device to the secondary communication device prior to the first data packet. As a result, it may also be determined, for example, whether or not an at least temporary modification of the transmission configuration is warranted, wherein in the present case, several previously transmitted data packets are possibly presently taken into consideration.

In further preferred embodiments, it is provided that the transmission configuration comprises at least one of the following elements: a) a transmission power, b) in the case of a use of an antenna system with the primary communication device, a directional characteristic of the antenna system, c) diversity, wherein, in particular, within the scope of diversity, a data packet to be transmitted, and/or redundancy information associated with the data packet to be transmitted, are transmitted to the at least one secondary communication device on at least two communication channels which are preferably different from one another, wherein, in particular, the two communication channels are characterized by at least one of the following elements: c1) different frequency ranges, in particular, frequency bands, c2) different time ranges, in particular, time slots, c3) different spatial propagation paths, c4) in the case of a use of code-multiplexing methods, different code groups, c5) in the case of a use of an antenna system with the primary communication device, different polarizations or polarization directions, c6) additional transmission of the data packet to be transmitted and/or the redundancy information, or information derived from the data packet to be transmitted and/or the redundancy information, from at least one other communication device which has access to the transmission medium, c7) additional transmission of the data packet to be transmitted and/or the redundancy information, or information derived from the data packet to be transmitted and/or the redundancy information, via one or several further transmission media and/or communication systems.

In further preferred embodiments, it is provided that the transmission configuration is modified as a function of the first information. It is thereby possible to adjust the transmission configuration, and thus a robustness of the transmission, to possibly occurring packet errors and/or other errors, in an efficient manner, during the transmission of data packets to the secondary communication device.

In further preferred embodiments, it is provided that the primary communication device transmits several data packets to the secondary communication device, wherein the primary communication device modifies the transmission configuration for at least two consecutive data packets, in particular, in the sense of an (in particular, stepwise) increase in the robustness of the transmission of the respective data packets, in particular, as long as the primary communication device does not receive an acknowledgment of the error-free receipt of a transmitted data packet by the secondary communication device. In other words, in further preferred embodiments, the robustness of the transmission may be increased by modifying the transmission configuration, in particular, stepwise, until the first time that the primary communication device receives an acknowledgment of the error-free receipt of a data packet transmitted to the secondary communication device, which may preferably also take place in the form of a data packet. In further preferred embodiments, the stepwise modification may also be carried out, in particular, even if a packet error does not already exist beforehand, i.e., for example, directly with the start of the primary communication device, or the like.

In further preferred embodiments, it is provided that when the primary communication device receives an acknowledgment of the error-free receipt of a transmitted data packet by the secondary communication device, said primary communication device (again) modifies the transmission configuration, in particular, in the sense of reducing the robustness of the transmission of the respective data packets, whereby transmission resources and/or computing resources are possibly conserved.

In further preferred embodiments, it is provided that at least the first data packet comprises at least one of the following elements: a) payload data, wherein, in particular, the payload data comprise time-critical and/or non-time-critical data, b) second information which characterizes whether a previous transmission of at least one data packet from the secondary communication device to the primary communication device was successful (said second information may be used in the secondary communication device for possibly adjusting its transmission configuration for transmissions of data packets to the primary communication device, for example, in order to increase the robustness of these transmissions at least temporarily), c) third information which characterizes the transmission configuration (in particular, the configuration used by the primary communication device for transmitting the existing data packet or at least one data packet to be transmitted in the future), d) redundancy information, in particular, check bits, which enable, in particular, the detection and/or correction of one and/or several transmission errors during the transmission of the first data packet to the secondary communication device (for example, by forming a checksum, for example, a CRC (cyclic redundancy check)).

Further preferred embodiments relate to a primary communication device, which is configured to transmit data packets to at least one secondary communication device via a transmission medium, wherein the primary communication device is configured for carrying out the following steps: at least temporarily modifying a transmission configuration for transmitting data packets, transmitting at least one first data packet to the at least one secondary communication device using the transmission configuration.

In further preferred embodiments, it is provided that the primary communication device is configured for carrying out the method according to the embodiments.

Further preferred embodiments relate to a method for operating a secondary communication device, which is configured to receive data packets from at least one primary communication device via a transmission medium, in particular, according to the embodiments, wherein the method comprises the following steps: receiving at least one first data packet from the at least one primary communication device via the transmission medium, and optionally checking whether third information, or the third information, which characterizes the transmission configuration of the primary communication device, is contained in the at least one first data packet.

In preferred embodiments, it is provided that, if the third information is contained in the at least one first data packet, an operation of the secondary communication device is carried out as a function of the third information.

In further preferred embodiments, it is provided that the method furthermore comprises: determining whether at least one error occurred during the transmission of the at least one first data packet from the primary communication device to the secondary communication device, and signaling to the primary communication device whether at least one error has occurred (for example, by means of the transmission of a data packet containing the signaling information).

In further preferred embodiments, it is provided that the secondary communication is configured to carry out one or several embodiments of the method for operating the primary communication device, for example, modifying its transmission configuration, and transmitting at least one data packet to the primary communication device using this transmission configuration. In this respect, the preferred embodiments and advantages described above with reference to the primary communication device apply correspondingly to the secondary communication device.

Further preferred embodiments relate to a secondary communication device, which is configured to receive data packets from at least one primary communication device via a transmission medium, in particular, according to the embodiments, wherein the secondary communication device is configured for carrying out the method according to the embodiments.

Further preferred embodiments relate to a use of the method according to the embodiments, and/or of the primary communication device according to the embodiments, and/or of the secondary communication device according to the embodiments, for transmitting data packets, in particular, data packets comprising time-critical data, via at least one transmission medium.

Further preferred embodiments relate to a communication system comprising at least one primary communication device according to the embodiments, and at least one secondary communication device according to the embodiments.

In further preferred embodiments, the communication system is a cyclical communication system, in particular, a cyclical communication system having a cycle time less than or equal to 10 milliseconds, ms, furthermore in particular, less than or equal to 1 ms.

Further preferred embodiments relate to a use of the communication system according to the embodiments for transmitting data packets, in particular, data packets comprising time-critical data, via at least one transmission medium.

Further features, application possibilities, and advantages of the present invention will arise from the following description of exemplary embodiments of the present invention, which are depicted in the figures of the drawing. All features described or depicted constitute the subject matter of the present invention, individually or in any combination, irrespective of their summary in the patent claims or their retroactive effect, and irrespective of their formulation or representation in the description or in the drawing.

DETAILED DESCRIPTION

Figure 1:
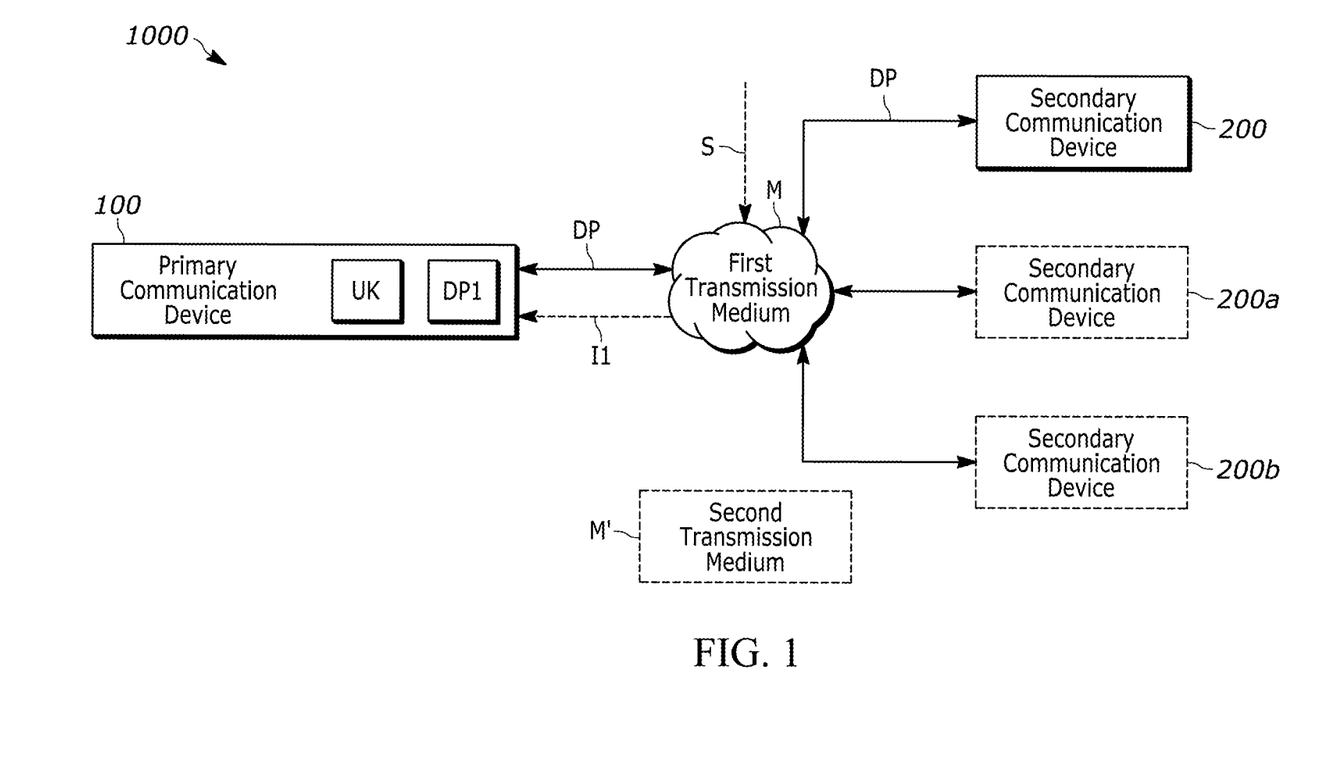
FIG. 1 schematically depicts a block diagram of a communication system according to preferred embodiments.

FIG. 1 schematically depicts a block diagram of a communication system 1000 according to preferred embodiments. The communication system 1000 comprises a primary communication device 100 which is configured to transmit data packets DP to at least one secondary communication device 200 via a transmission medium M. In further preferred embodiments, additional secondary communication devices 200a, 200b are optionally provided, which may also exchange (transmit and/or receive) data packets with the primary communication device 100.

In further preferred embodiments, the transmission medium M is a shared transmission medium M, which is usable by primary and/or secondary communication device (s) 100, 200, 200a, 200b in a shared manner. In further preferred embodiments, the transmission medium M comprises a wired medium, for example, a network comprising data lines (for example, an Ethernet network). In further preferred embodiments, the transmission medium M comprises a non-wired medium, for example, a radio system, in which data, in particular, also the data packets DP, can be exchanged by means of electromagnetic waves. In further embodiments, the transmission medium M comprises a combination of at least one wired medium or section, and at least one non-wired medium or section.

As symbolized in FIG. 1 by the dashed arrow S, disturbances may occur in the area of the transmission medium M, which may result in data packets not being correctly transmissible, in particular, without errors (or having a number of errors which are possibly correctable by means of error correction methods), or not being transmissible at all, between the communication devices 100, 200 (packet loss). In further preferred embodiments, several transmission media M, M' may also be provided for an exchange (transmission and/or reception) of data packets DP between the communication devices 100, 200; see the optional further transmission medium indicated by a dashed block M' in FIG. 1. For example, the transmission medium M may comprise a wired Ethernet network, and the optional further transmission medium M' comprises, for example, a cellular mobile radio system, for example, fourth-generation (4G, for example, LTE) or fifth-generation (5G).

Figure 2:
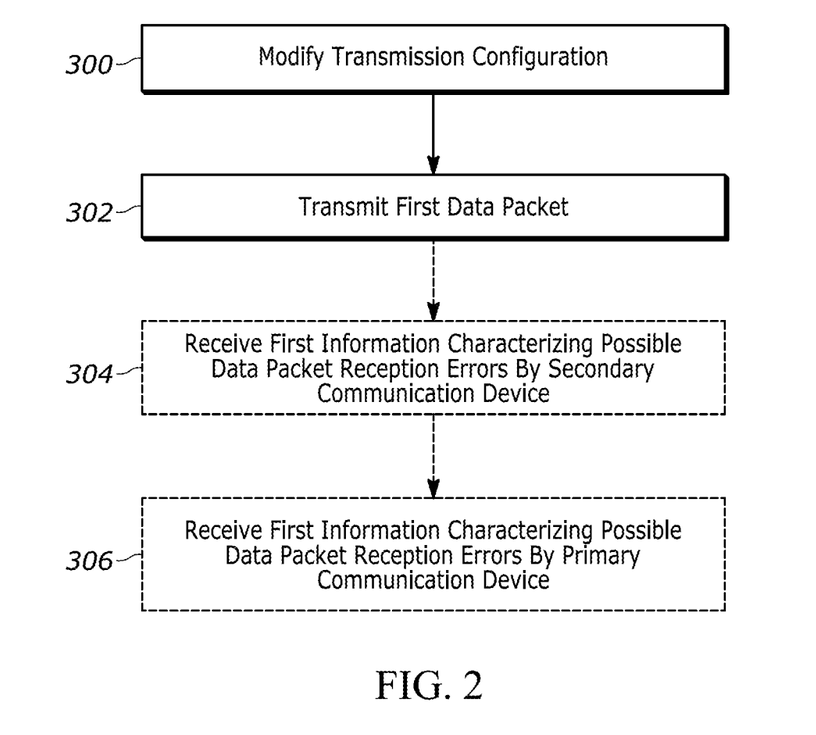
FIG. 2 schematically depicts a simplified flow chart of a method according to further preferred embodiments.

Therefore, in preferred embodiments, a method for operating the primary communication device 100 is provided; see the flow diagram from FIG. 2, wherein the method comprises the following steps: at least temporarily modifying 300 a transmission configuration UK (FIG. 1) for transmitting data packets DP, transmitting 302 (FIG. 2) at least one first data packet DP1 (FIG. 1) to the at least one secondary communication device 200 using the transmission configuration UK. By modifying 300 the transmission configuration UK, the transmission of the first data packet DP1 (and possibly also the transmission of further data packets to be transmitted) may be advantageously adjusted to existing operating conditions, and in particular, transmission conditions in the area of the transmission medium M, for example, the disturbance(s) S, whereby, for example, a reception quality of the respective data packets DP1, DP at the secondary communication device 200 may be improved such that the packet error rate or packet loss rate is reduced. In particular, it is thereby possible to effect an increase in the robustness of the transmission of data packets to the secondary communication device 200 dynamically, i.e., during the runtime of the primary communication device 100, for example, at least temporarily.

In further preferred embodiments, it is provided that the method, see FIG. 2, furthermore comprises the optional steps 304 and/or 306 described below: receiving 304 first information I1 (FIG. 1) which characterizes possible errors in a reception of the first data packet DP1 by the secondary communication device 200, and/or receiving 306 first information which characterizes the possible errors in a reception of at least one data packet transmitted from the primary communication device 100 to the secondary communication device 200 prior to the first data packet DP1.

In further preferred embodiments, it is provided that the primary communication device 100 carries out a further operation, in particular, the future transmission of further data packets DP to the secondary communication device 200, as a function of the first information I1. It is thereby possible, for example, to set and/or modify the aforementioned transmission configuration UK as a function of the first information I1, for example, in order to account for a corresponding number of transmission errors or disturbances S (FIG. 1) in the earlier transmission of data packets.

In further preferred embodiments, it is provided that the transmission configuration UK (FIG. 1) comprises at least one of the following elements:

a transmission power (it is thereby possible, for example, to influence a signal-to noise ratio (SNR), in particular, also in the case of several receivers 200, 200a, 200b);

in the case of a use of an optional antenna system 13a (see FIG. 7 below) with the primary communication device 100: a directional characteristic of the antenna system (for example, by implementing a beam-forming method);

diversity, wherein, in particular, within the scope of the diversity, a data packet DP to be transmitted and/or redundancy information associated with the data packet DP to be transmitted (for example, copies of parts of the data packet DP and/or information derived from parts of data packet DP, for example, parity values or checksums) are transmitted to the at least one secondary communication device 200 on at least two communication channels which are preferably different from one another. In further preferred embodiments, the at least two communication channels are both implementable by means of the transmission medium M (FIG. 1). In further preferred embodiments, the at least two communication channels are implementable by means of different transmission media M, M'.

In further preferred embodiments, the two communication channels are characterized, for example, in particular, by at least one of the following elements: c1) different frequency ranges, in particular, frequency bands, c2) different time ranges, in particular, time slots, c3) different spatial propagation paths (spatial diversity), c4) in the case of a use of code-multiplexing methods (for example, CDMA, code-division multiple access), different code groups, c5) in the case of a use of an antenna system 13a (FIG. 7) with the primary communication device 100, different polarizations or polarization directions (horizontal and/or vertical and/or circular, etc.), c6) additional transmission of the data packet to be transmitted and/or the redundancy information, or information derived from the data packet to be transmitted and/or the redundancy information, from at least one other communication device which has access to the transmission medium M, M' (for example, a further communication device 200a), c7) additional transmission of the data packet to be transmitted and/or the redundancy information, or information derived from the data packet to be transmitted and/or the redundancy information, via one or several further transmission media M' and/or communication systems (for example, WLAN as a first transmission medium M or communication system, and if required, for example, Bluetooth as a second transmission medium M' or communication system).

In further preferred embodiments, modifying 300 (FIG. 2) the transmission configuration UK comprises modifying at least one of the aforementioned elements a), b), c), c1), . . . , c7).

Figure 3:
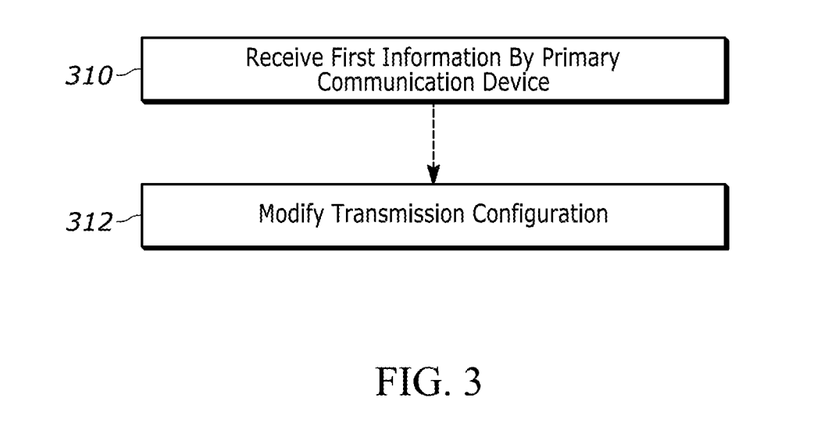
FIG. 3 schematically depicts a simplified flow chart of a method according to further preferred embodiments.

In further preferred embodiments, it is provided that the transmission configuration UK (FIG. 1) is modified as a function of the first information I1 (FIG. 1). For this purpose, FIG. 3 schematically depicts a simplified flow chart. In step 310, the first information I1 is received by the primary communication device 100 from, for example, the secondary communication device 200. In step 312, the transmission configuration UK is modified as a function of the first information I1 previously received in step 310, whereby, for example, a packet error rate which is increased with respect to previous data transmissions may be taken into consideration. In this way, data packets to be transmitted in the future, i.e., after step 312, may be transmitted, for example, having such a modified transmission configuration UK, which effects an increased robustness of the data transmission.

Figure 4:
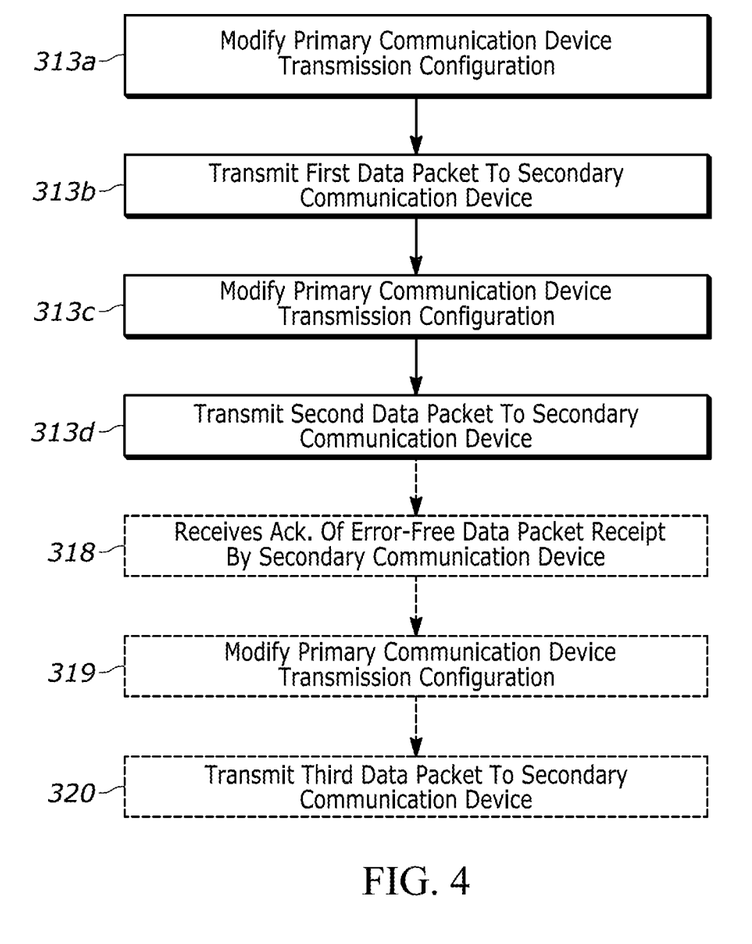
FIG. 4 schematically depicts a simplified flow chart of a method according to further preferred embodiments.

In further preferred embodiments, it is provided that the primary communication device 100 (FIG. 1) transmits several data packets DP to the secondary communication device 200, wherein the primary communication device 100 modifies the transmission configuration UK (FIG. 1) for at least two consecutive data packets DP, in particular, in the sense of increasing the robustness of the transmission of the respective data packets, in particular, as long as the primary communication device 100 does not receive an acknowledgment of the error-free receipt of a transmitted data packet by the secondary communication device 200. For this purpose, FIG. 4 schematically depicts a simplified flow chart. In step 313a, the primary communication device 100 (FIG. 1) modifies its transmission configuration UK, for example, as a function of previously received first information I1 (see, for example, step 310 from FIG. 3); in step 313b, the primary communication device 100 transmits a first data packet to the secondary communication device 200. In the present case, following step 313b, the primary communication device 100 does not receive an acknowledgment of the error-free reception of the transmitted first data packet by the secondary communication device 200. Therefore, in step 313c, the primary communication device 100 again modifies its transmission configuration UK, with the goal of increasing the robustness of the transmission. For example, in step 313c, the transmission configuration UK may be modified in such a way that more redundancy information is added to the data packet(s) to be transmitted in the future. In step 313d, the primary communication device 100 sends or transmits a second data packet (with the aforementioned supplemented redundancy information) to the secondary communication device 200.

Thereupon, in the optional step 318 (FIG. 4), the primary communication device 100 receives an acknowledgment of the error-free receipt of the transmitted second data packet from the secondary communication device 200. The secondary communication device 200 can also transmit this confirmation, for example, in the form of a data packet, to the primary communication device 100, preferably via the transmission medium M, which, in particular, is shared. In the following step 319, which is also optional, the primary communication device 100 leaves the transmission configuration UK at the configuration used previously for step 313d of transmitting the second data packet, in particular, because this transmission was successful (and confirmed by the secondary communication device 200). Alternatively, the primary communication device 100 modifies the transmission configuration UK again in step 319, in particular, in the sense of reducing the robustness of the transmission of the respective data packets, thus enabling an efficient use of resources. In the further optional step 320, the primary communication device 100 sends or transmits a third data packet (with the transmission configuration UK which was left or modified according to step 319) to the secondary communication device 200.

In further preferred embodiments, it is provided that at least the first data packet DP1 (preferably also additional data packets DP) comprises at least one of the following elements: a) payload data, wherein, in particular, the payload data comprise time-critical and/or non-time-critical data, b) second information which characterizes whether a previous transmission of at least one data packet from the secondary communication device 200 to the primary communication device 100 was successful, c) third information which characterizes the transmission configuration UK, d) redundancy information, in particular, check bits, which enable, in particular, the detection and/or correction of one and/or several transmission errors during the transmission of the first data packet DP1 to the secondary communication device 200.

In further preferred embodiments, modifying 300 (FIG. 2) the transmission configuration UK may also take place in such a manner that the robustness of the transmission of the data packets DP is reduced. This may, for example, take place if there are no packet errors or a tolerable number of packet errors. As a result, it is advantageously possible to save resources.

Further preferred embodiments relate to a primary communication device 100 (FIG. 1), which is configured to carry out the method according to the embodiments.

Figure 5:
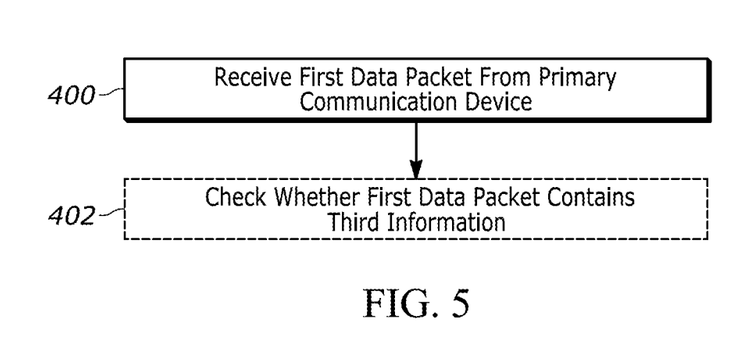
FIG. 5 schematically depicts a simplified flow chart of a method according to further preferred embodiments.

Further preferred embodiments relate to a method for operating a secondary communication device 200 (FIG. 1), which is configured to receive data packets DP, DP1 from at least one, or the, primary communication device 100, via a, or the, transmission medium M (optionally, the further transmission medium M'), in particular, according to the embodiments, wherein the method comprises the following steps; see the flow chart from FIG. 5: receiving 400 at least one first data packet DP1 from the at least one primary communication device 100 via the transmission medium M, and optionally checking 402 whether third information, or the third information, which characterizes the transmission configuration UK of the primary communication device 100, is contained in the at least one first data packet DP1. In further preferred embodiments, it is provided that if the third information is contained in the at least one first data packet DP1, an operation of the secondary communication device 200 is carried out as a function of the third information. As a result, a reception of data packets sent to the secondary communication device 200 by the primary communication device 100, using the transmission configuration UK, may be adjusted to this transmission configuration UK (for example, taking into consideration expanded redundancy information, further communication channels, etc.).

Figure 6:
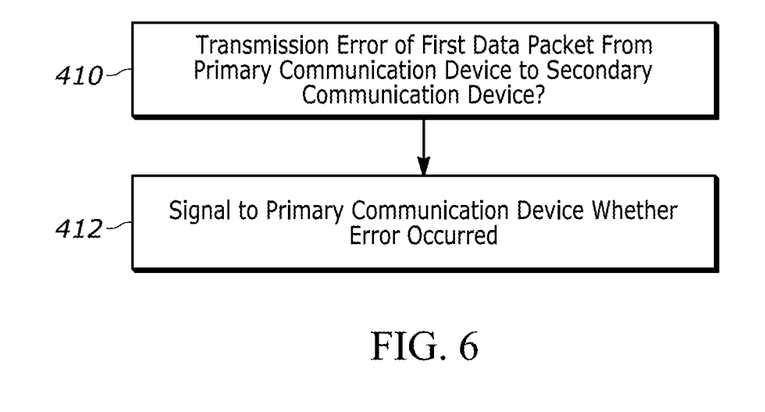
FIG. 6 schematically depicts a simplified flow chart of a method according to further preferred embodiments.

In further preferred embodiments, see the flow chart from FIG. 6, it is provided that the method furthermore comprises: determining 410, by means of the secondary communication device 200, whether at least one error has occurred in the transmission of the at least one first data packet DP1 from the primary communication device 100 to the secondary communication device 200 (for example, by checking a checksum or parity information), and signaling 412, by means of the secondary communication device 200, to the primary communication device 100 whether at least one error has occurred (this signaling 412 corresponds, for example, to the first information I1 (FIG. 1)).

Further preferred embodiments relate to a secondary communication device 200, which is configured to carry out the method described above.

Further preferred embodiments relate to a use of the method according to the embodiments, and/or of the primary communication device 100 according to the embodiments, and/or of the secondary communication device 200 according to the embodiments, and/or of the communication system 1000 according to the embodiments, for transmitting data packets DP, DP1, in particular, data packets comprising time-critical data, via at least one transmission medium M, M'.

Figure 7:
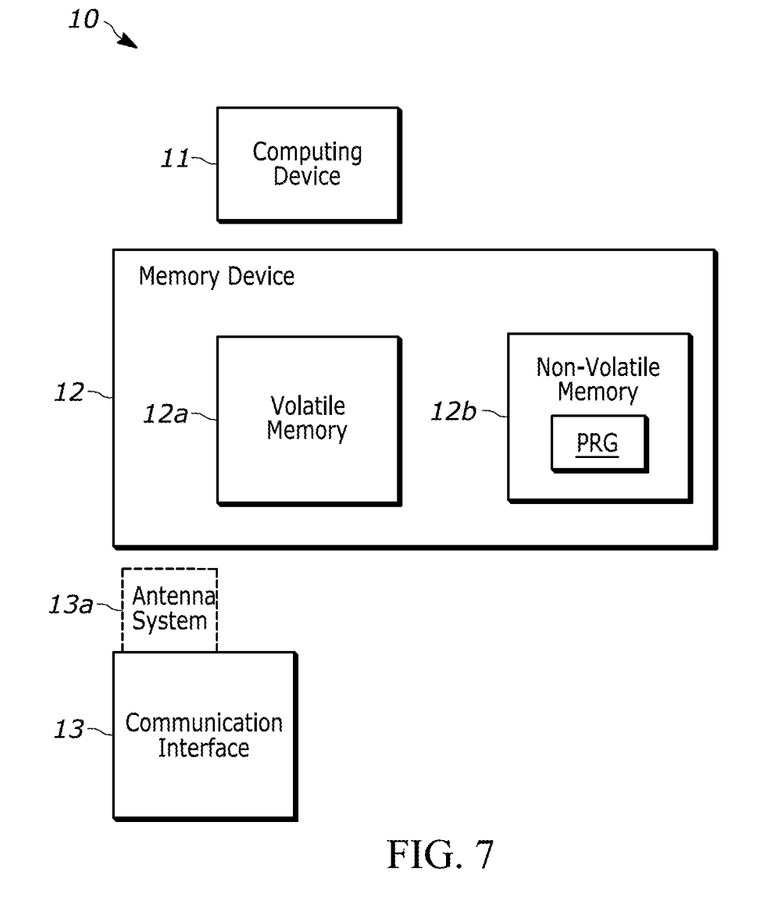
FIG. 7 schematically depicts a simplified block diagram of a communication device according to further preferred embodiments.

FIG. 7 schematically depicts a simplified block diagram of a communication device 10 according to further preferred embodiments. For example, the primary communication device 100 and/or the secondary communication device 200 from FIG. 1 may have the configuration 10 according to FIG. 7.

The communication device 10 according to FIG. 7 comprises at least one computing device 11, at least one memory device 12 which is associated with the computing device 11, for at least temporarily storing a computer program PRG, wherein the computer program PRG is configured, in particular, for controlling an operation of the communication device 10. For example, in further preferred embodiments, the computer program PRG may be configured to control the operation of the communication device 10 in such a way that the functionality of the primary communication device 100 described above with reference to FIGS. 1 to 6 is thereby achieved. Furthermore, for example, in further preferred embodiments, the computer program PRG may be configured to control the operation of the communication device 10 in such a way that the functionality of the secondary communication device 200 described above with reference to FIGS. 1 to 6 is thereby achieved. Still furthermore, for example, in further preferred embodiments, the computer program PRG may be configured to control the operation of the communication device 10 in such a way that the functionality of the primary communication device 100 described above with reference to FIGS. 1 to 6 is thereby achieved at least temporarily or selectively (for example, predeterminable by means of parameterization or configuration), and the functionality of the secondary communication device 200 described above with reference to FIGS. 1 to 6 is thereby achieved at least temporarily or selectively (for example, predeterminable by parameterization or configuration).

In further preferred embodiments, the computing device 11 comprises at least one of the following elements: a microprocessor, a microcontroller, a digital signal processor (DSP), a programmable logic component (for example, FPGA, field-programmable gate array), an ASIC (application-specific integrated circuit). Combinations thereof are also conceivable in further preferred embodiments.

In further preferred embodiments, the memory device 12 comprises at least one of the following elements: a volatile memory 12a, in particular, random-access memory (RAM), a non-volatile memory 12b, in particular, flash-EEPROM. Preferably, the computer program PRG is stored in the non-volatile memory 12b.

In further preferred embodiments, the communication device 10 comprises a communication interface 13 to the transmission medium or media M, M' (FIG. 1). The communication interface 13 may, for example, comprise one or several transceivers (transmitters/receivers) for transmitting and/or receiving data, in particular, data packets, via a wired and/or non-wired medium. Optionally, the communication interface 13 may also comprise at least one antenna system 13a, the directional characteristic of which is modifiable, for example, within the scope of modifying the transmission configuration UK.

Following is a description of further preferred embodiments and aspects, which may respectively be combined with one or several of the embodiments described above, individually or combination with each other.

In further preferred embodiments, the communication system 1000 may, for example, be configured as a cyclical communication system, for example, for use in closed-loop control applications, such as those used in industrial manufacturing, and further preferred embodiments of the method may advantageously be used for avoiding several packet errors (for example, packet loss) in succession.

By modifying 300 (FIG. 2) the transmission configuration UK (FIG. 1), a rapid adaptive adjustment of transmission parameters is made possible, for example, in the event that previous transmissions of data packets were unsuccessful. Further preferred embodiments thus make it possible to avoid consecutive packet errors, in particular, even in time-critical real-time transmission systems 1000, without, for example, requiring conventional automatic packet retransmissions (for example, by means of automatic repeat request (ARQ)).

Further preferred embodiments of the communication system 1000 are suitable, in particular, for wired or wireless, in particular, time-critical, cyclical transmission systems having extremely low cycle times, which, for example, do not allow repetition of erroneous data packets. Such embodiments are applicable, for example, in industrial communication.

Further preferred embodiments 100, 200, 1000 are also usable for the transmission of time-critical data packets, for example, in real-time-capable networks, in which the transmission of the time-critical data packets is guaranteed, for example, in predeterminable time windows. In further preferred embodiments, these time windows are determined by communication cycles in which, for example, data are exchanged periodically. In such real-time-capable networks, it is ensured that, for example, valid control data and status information are available to the devices 100 and 200 at specific times and can be further processed.

An example of real-time-capable networks according to further preferred embodiments is the field of industrial automation, in which, for example, in the case of so-called "closed-loop control applications," control and status data are continuously exchanged between, for example, a central control device (for example, comprising the primary communication device 100), and several sensors and/or actuators (for example, respectively comprising a secondary communication device 200).

Further preferred embodiments relate to the use of communication methods in in industrial automation, for example, Sercos III, Profinet, and EtherCAT, which, for example, use wired data transmission according to the Ethernet standard, via which low bit error probabilities, and thus low packet error probabilities, may generally be achieved. However, packet errors cannot be completely ruled out. With the aid of checksums according to the Ethernet standard, such packet errors can usually be detected in a reliable manner. However, correcting a packet error with the checksum is not possible in some systems. Retransmitting an erroneous data packet within the generally very short cycle times (for example, less than or equal to 1 millisecond, ms) is often not possible in some systems, and is also not provided in many industrial Ethernet protocols.

Further preferred embodiments relate to the use of real-time-capable networks having short cycle times (for example, less than or equal to 1 ms), wherein transmission media M (FIG. 1) having a comparatively high bit error probability are also usable. Examples of such transmission media according to further preferred embodiments include radio transmission, unshielded cables, etc. In particular, radio methods according to further preferred embodiments provide advantages due to increased mobility and flexibility of the overall system or facility. In further preferred embodiments, the communication system 1000 is configured as a cyclical communication system having cycle times less than or equal to 10 ms, in particular, less than or equal to 1 ms, and comprises, in particular, a radio-based transmission medium (for example, free space).

Methods known per se, such as "automatic repeat request" (ARQ), in which the lost packet request is retransmitted by the receiver in the event of a packet error, cannot be implemented, in particular, in time-critical communication systems. Often, there is simply not enough time between a possibly erroneous data transmission and a deadline (time limit) by which the data must be available in order to repeat the data transmission.

According to analyses by the applicant, in further preferred embodiments, the transmission configuration UK already described above (FIG. 1, see the aspects described above: a) transmission power, b) directional characteristic, c) diversity (in particular, c1) to c7))), or the modification 300 thereof (FIG. 2), may be used to influence, in particular, reduce, a packet error rate, which is advantageous, in particular, in the case of a transmission with the aid of a radio system as the transmission medium M.

In further preferred embodiments, the method described above by way of example, with reference to FIG. 2, in particular, steps 300, 302 (not necessarily the optional further steps 304, 306), is carried out, in particular, briefly, following a packet error, in order to reduce the probability of subsequent errors in the transmission of further data packets.

In further preferred embodiments, the primary communication device 100 is configured to transmit data packets DP to the at least one secondary communication device 200 repeatedly, in particular, periodically, for example, with a cycle time <=10 ms or <=1 ms. In further preferred embodiments, the secondary communication device 200 is configured to transmit data packets DP to the primary communication device 100 repeatedly, in particular, periodically, for example, with a cycle time<=10 ms or <=1 ms.

In further preferred embodiments, the cycle time for the periodic transmission of the respective data packets is so short that no retransmission (for example, ARQ) is possible within one (same) cycle, or no retransmission is desired for other reasons.

In further preferred embodiments, the primary communication device 100 is configured to improve the reception quality of a signal or a data packet transmitted by said primary communication device at least temporarily, in particular, for a short time, for example, by modifying 300 (FIG. 2) the transmission configuration UK in order to increase the probability of a successful transmission.

In further preferred embodiments, bidirectional communication between the communication devices 100, 200 is possible in the communication system 1000 according to FIG. 1; see the double arrows DP and the further double arrows which are not labeled. In further preferred embodiments, in the communication system 1000 according to FIG. 1, the correspondingly required transmission resources are reserved for real-time data traffic in each communication cycle of the communication system 1000.

In further preferred embodiments, data packets transmitted from the primary communication device 100 and/or from the secondary communication device 200 to the respective other component 200, 100 may comprise, for example, payload data, in particular, time-critical data or payload data, optionally, also signaling data and/or possibly further data, for example, non-time-critical data.

In further preferred embodiments, a cycle of the communication system 1000 (FIG. 1) comprises the following steps: 1. in the forward direction (from the primary communication device 100 to the at least one secondary communication device 200), the primary communication device 100 sends or transmits a data packet DP to the at least one secondary communication device 200 in one cycle, via the transmission medium M, which is possibly disturbed.

In further preferred embodiments, the data packet DP comprises:
 a. (in particular, time-critical) payload data,
 b. a piece of information about whether a previous transmission from the secondary communication device 200 to the primary communication device 100 was successful (for example, ACK or NACK, wherein "ACK" indicates that the transmission was successful, and thus the transmitted data packet DP does not have a packet error; and wherein "NACK" indicates that the transmission was unsuccessful, and thus the transmitted data packet DP has a packet error). Alternatively, the piece of information with respect to aspect b. above may also be a piece of information about whether the transmission of the secondary communication device 200 to the primary communication device 100 which occurred (N−1) cycles ago was successful, for example, if the primary communication device 100 cannot completely decode a received data packet within one cycle. However, for sake of simplicity and without limiting generality, the former case will be considered below, wherein the ACK/NACK relates to an immediately preceding transmission of a data packet DP from the device 200 to the device 100. The generalized case can be treated similarly in further preferred embodiments.
 c. (optionally) information which informs about additional transmission resources currently used by the primary communication device 100, and/or which characterizes the transmission configuration UK.
 d. (optionally) non-time-critical data which are to be transmitted, but for which a delay is tolerable.

e. (optionally) redundancy information, for example, in the form of check bits, with the aid of which transmission errors may be detected and possibly corrected, for example, by the secondary communication device 200.

In further preferred embodiments, it is provided that, if the secondary communication device 200 previously communicated that a preceding data packet which was transmitted from the primary communication device 100 to said secondary communication device was erroneous and was discarded, the primary communication device 100 uses one or several of the measures described in the previous section in the current cycle, in particular, by way of modifying 300 the transmission configuration UK, in order to increase the probability of a successful transmission for the data packet.

In further preferred embodiments, it is provided that the secondary communication device 200 determines a current transmission configuration UK of the data packet, for example, by evaluating the relevant information contained in the data packet. If, for example, the transmission configuration UK or the information characterizing the transmission configuration UK indicates that additional transmission resources are being used by the primary communication device 100 in the current communication cycle, the secondary communication device 200 preferably adjusts itself for receiving the additional piece(s) of information, for example, via alternative channels.

In further preferred embodiments, it is provided that the secondary communication device 200 observes these additional channels at least temporarily or constantly (in particular, without prior signaling by the primary communication device 100).

In further preferred embodiments, it is provided that the secondary communication device 200 determines, by means of redundancy information contained in the received data packet, in particular, check bits, whether errors (one or several errors) occurred during the transmission of the data packet from the primary communication device 100 to the secondary communication device 200.

In further preferred embodiments, it is provided that, in the event of at least one error, the secondary communication device 200 determines whether the error or errors can be completely corrected, for example, using the redundancy information contained in the received data packet. If so, in further preferred embodiments, the errors may be corrected, and the information of the data packet (or portions thereof, for example, payload data) may be, for example, passed to an application executed on the computing device 11 (FIG. 7) of the secondary communication device 200. If not, in further preferred embodiments, it is signaled to the application that at least one transmission error has occurred and no valid data are available in this cycle.

In further preferred embodiments, it is provided that the secondary communication device 200 transmits a further data packet to the primary communication device 100 in a reverse direction (from the secondary communication device 200 to the at least one primary communication device 100) in the same cycle.

In further preferred embodiments, the further data packet may comprise the same elements or portions thereof, as the data packet transmitted previously in the forward direction. However, in further preferred embodiments, the elements of the further data packet may possibly have a different size: a. the (in particular) time-critical payload data, b. a piece of information about whether the previous transmission from the primary communication device 100 to the secondary communication device 200 was successful (for example, in the form of "ACK" or "NACK"), c. (optionally) a piece of information which indicates a current configuration of the error correction, for example, the amount of redundancy information, for example, a number of check bits, d. (optionally) non-time-critical information which is to be transmitted, but for which a possible delay is tolerable, e. redundancy information, for example, in the form of check bits, with the aid of which, in particular, transmission errors can be detected and possibly corrected.

In further preferred embodiments, the above method described by way of example with reference to FIGS. 2, 3, 4 may alternatively or additionally also be carried out by the secondary communication device 200 (FIG. 1), in order, at least temporarily, to modify, in particular, to increase (or to reduce, for example, to save resources), the robustness of the transmission of data packets to the primary communication device 100.

In further preferred embodiments, the transmission configuration UK may be modified again (step 300 from FIG. 2), in particular, with respect to a specified transmission direction, following a successful transmission of a data packet, in particular, immediately or following a predeterminable period of time, in particular, in the sense of reducing the robustness of the transmission of the respective data packets, whereby transmission resources are released (for example, use of a lower number of parity bits and/or communication channels, etc.). In this manner, the energy consumption for operating the relevant communication device 100, 200 is only minimally increased, averaged over time, relative to conventional approaches, and possibly adjacent communication systems (not depicted) are limited only in rare cases, if at all.

In further preferred embodiments, the primary communication device 100 determines a number of packet errors over a predeterminable first number of past transmissions or communication cycles, and carries out the step of modifying 300 (FIG. 2) the transmission configuration as a function of the number of packet errors. In this manner, in the case of a larger number of packet errors, further measures (for example, adding several additional communication channels) may possibly be taken for increasing the robustness of the data transmission, than in situations having a smaller number of packet errors (here, for example, adding an additional communication channel).

In further preferred embodiments, the primary communication device 100 prepares a future modification 300 of the transmission configuration UK as soon as a first packet error occurs, for example, by signaling to the secondary communication device 200 that a modified transmission configuration UK will be used by the primary communication device 100 after M future communication cycles. As a result, in further preferred embodiments, a certain lead time results in order to prepare the additional measures, in particular, on the side of the secondary communication device 200.

In further preferred embodiments, the primary communication device 100 modifies the transmission configuration UK stepwise, in particular, each time another packet error occurs, similarly to the process already described with reference to FIG. 4.

In further preferred embodiments, here, the same element a), b), c) of the transmission configuration UK, for example, the transmission power, may be modified in each case, for example, increased stepwise for each further error.

However, in further preferred embodiments, another element a), b), c) of the transmission configuration UK may also be modified than in the previous step of modification. If, for example, in a previous step 300 of modifying, the transmission power of the primary communication device 100 has been increased in a subsequent but repeated step 300 of modifying, for example, the directional characteristic (aspect b)) or the diversity (aspect c)), in particular, at least one of the sub-aspects c1) to c7), may be modified.

Further preferred embodiments advantageously allow the transmission quality of data packets DP to be secured or increased, and may advantageously be carried out at least temporarily by both the primary communication device 100 and the secondary communication device 200. In particular, multiple errors, for example, consecutive packet errors, may be reduced or avoided by means of preferred embodiments.

Below, advantages and advantageous aspects are listed, which are at least temporarily achievable by means of at least some preferred embodiments: very short cycle times for cyclical communication, in particular, if no retransmissions (ARQ) occur; moderate transmission power and a moderate use of valuable transmission resources (time, frequency, space, code etc.), averaged over time, in particular, if additional measures are taken for increasing the robustness, for example, by way of modifying 300 a transmission configuration UK, for example, only in rare cases, for example, if one or several packet errors have occurred, and if such measures or the relevant transmission configuration UK is generally applied only temporarily, for example, until no more packet errors occur; efficiently avoiding possibly critical multiple errors, which is an important quality feature, in particular, for certain applications, for example, in industrial communication.

In further preferred embodiments, the principle according to the embodiments is used in communication systems in which data are transmitted in the form of data packets, in particular, in a time-critical manner, and in which, in particular, isolated packet errors are non-critical or tolerable.

In further preferred embodiments, the principle according to the embodiments is used in communication systems for real-time communication, in particular, in industrial automation, for example, in so-called "closed-loop control applications." In further preferred embodiments, the use of the principle according to the embodiments in communication systems is also conceivable in further systems in which, for example, real-time data streams are processed, wherein individual packet error are tolerable, for example, because they are correctable by means of interpolation.

Further examples for a use of the principle according to the embodiments include control tasks in vehicles, (for example, steer-by-wire, brake-by-wire) and/or cyber-physical systems, for example, robots, in which, particularly in the event of errors, it is more important for current commands to be successfully transmitted than for previous commands to be repeated.

The invention claimed is:

1. A method for operating a primary communication device (100) in a communication system, which is configured to transmit data packets (DP) to at least one secondary communication device (200) via a transmission medium (M), wherein the method comprises the following steps:
    at least temporarily modifying (300) a transmission configuration (UK) for transmitting data packets, and
    transmitting (302) a first data packet (DP1) to the at least one secondary communication device (200) via the transmission medium (M) using the transmission configuration (UK),
    wherein the transmission configuration (UK) comprises,
        b) in the event of a use of an antenna system with the primary communication device (100), a directional characteristic of the antenna system, wherein, a data packet to be transmitted, and/or redundancy information associated with the data packet to be transmitted, are transmitted to the at least one secondary communication device (200) on at least two communication channels which are different from one another, wherein the two communication channels are characterized by at least one selected from the group consisting of the following elements: c1) different frequency ranges, c2) different time ranges, c3) different spatial propagation paths, c4) in the case of a use of code-multiplexing methods, different code groups, c5) in the case of a use of an antenna system with the primary communication device, different polarizations or polarization directions, c6) additional transmission of the data packet to be transmitted, and c7) additional transmission of redundancy information,
    wherein at least temporarily modifying (300) the transmission configuration (UK) includes changing at least one of the above-mentioned elements b), c), c1), . . . , c7),
    the communication system is a cyclical communication system, the primary communication device is configured to transmit data packets to the at least one secondary communication device cyclically with a defined cycle time,
    the method further comprises receiving (304; 310) first information (I1) which characterizes possible errors in a reception a) of the first data packet (DP1) by the secondary communication device (200), and/or b) of at least one data packet (DP) transmitted from the primary communication device (100) to the secondary communication device (200) prior to the first data packet (DP1),
    the transmission configuration (UK) is modified as a function of the first information (I1) for avoiding a plurality of packet errors or a plurality of packet losses in succession, and
    the first data packet is not retransmitted.

2. The method as claimed in claim 1, wherein the transmission configuration (UK) is modified (312) as a function of the first information (I1).

3. The method as claimed in claim 1, wherein the primary communication device (100) transmits (313b, 313d) several data packets to the secondary communication device (200), and wherein the primary communication device (100) modifies (313a, 313c) the transmission configuration (UK) for at least two consecutive data packets.

4. The method as claimed in claim 3, wherein, when the primary communication device (100) receives (318) an acknowledgment of the error-free receipt of a transmitted data packet by the secondary communication device (200), said primary communication device modifies (319) the transmission configuration (UK).

5. The method as claimed in claim 1, wherein at least the first data packet (DP1) comprises at least one of selected from the group consisting of the following elements: a) payload data, b) second information which characterizes whether a previous transmission of at least one data packet from the secondary communication device (200) to the primary communication device (100) was successful, c) third information which characterizes the transmission configuration (UK), d) redundancy information.

6. A primary communication device (100) in a communication system, the primary communication device comprising:
    a controller configured to transmit data packets (DP) to at least one secondary communication device (200) via a transmission medium (M), at least temporarily modify (300) a transmission configuration (UK) for transmitting data packets, and transmit (302) a first data packet (DP1) to the at least one secondary communication device (200) via the transmission medium (M) using the transmission configuration (UK), wherein the transmission configuration (UK) comprises b) in the event of a use of an antenna system with the primary communication device (100), a directional characteristic of the antenna system, wherein, a data packet to be transmitted, and/or redundancy information associated with the data packet to be transmitted, are transmitted to the at least one secondary communication device (200) on at least two communication channels which are different from one another, wherein the two communication channels are characterized by at least one selected from the group consisting of the following elements: c1) different frequency ranges, c2) different time ranges, c3) different spatial propagation paths, c4) in the case of a use of code-multiplexing methods, different code groups, c5) in the case of a use of an antenna system with the primary communication device, different polarizations or polarization directions, c6) additional transmission of the data packet to be transmitted, and c7) additional transmission of redundancy information, wherein at least temporarily modifying (300) the transmission configuration (UK) includes changing at least one of the above-mentioned elements b), c), c1), . . . , c7), the communication system is a cyclical communication system, the controller is configured to transmit data packets to the at least one secondary communication device cyclically with a defined cycle time, the controller is further configured to receive (304; 310) first information (I1) which characterizes possible errors in a reception a) of the first data packet (DP1) by the secondary communication device (200), and/or b) of at least one data packet (DP) transmitted from the primary communication device (100) to the secondary communication device (200) prior to the first data packet (DP1), the transmission configuration (UK) is modified as a function of the first information for avoiding a plurality of packet errors or packet losses in succession, and the first data packet is not retransmitted.

7. A method for operating a secondary communication device (200), which is configured to receive data packets (DP) from at least one primary communication device (100) via a transmission medium (M) as claimed in claim 6, wherein the method includes the following steps: receiving (400) the first data packet (DP1) from the at least one primary communication device (100) via the transmission medium (M), and checking (402) whether third information, or the third information, which characterizes the transmission configuration (UK) of the primary communication device (100), is contained in the first data packet (DP1).

8. The method as claimed in claim 7, wherein it is provided that, if the third information is contained in the first data packet (DP1), an operation of the secondary communication device (200) is carried out as a function of the third information.

9. The method as claimed in claim 7, furthermore comprising: determining (410) whether at least one error occurred during the transmission of the first data packet (DP1) from the primary communication device (100) to the secondary communication device (100), and signaling (412) to the primary communication device (100) whether at least one error has occurred.

10. A communication system (1000) comprising at least one primary communication device (100) as claimed in claim 6, and at least one secondary communication device (200) which is configured to receive data packets (DP) from the at least one primary communication device (100) via a transmission medium (M), and configured to check (402) whether third information is contained in the first data packet (DP1).

* * * * *